(12) United States Patent  
Dolganow et al.

(10) Patent No.: US 9,385,992 B2
(45) Date of Patent: Jul. 5, 2016

(54) INLINE KEY-BASED PEER-TO-PEER PROCESSING

(75) Inventors: Andrew Dolganow, Ottawa (CA); Steve Morin, Ottawa (CA)

(73) Assignee: Alcatel Lucent, Boulogne-Billancourt (FR)

(*) Notice: Subject to any disclaimer, the term of this patent is extended or adjusted under 35 U.S.C. 154(b) by 2114 days.

(21) Appl. No.: 12/371,261

(22) Filed: Feb. 13, 2009

(65) Prior Publication Data

US 2010/0211789 A1    Aug. 19, 2010

(51) Int. Cl.
G06F 11/00 (2006.01)
H04L 29/06 (2006.01)
H04L 29/08 (2006.01)

(52) U.S. Cl.
CPC ........ H04L 63/0227 (2013.01); H04L 63/1441 (2013.01); H04L 67/104 (2013.01)

(58) Field of Classification Search
CPC ............ H04L 63/0227; H04L 63/1441; H04L 67/104
See application file for complete search history.

(56) References Cited

U.S. PATENT DOCUMENTS

| 6,983,326 B1* | 1/2006 | Vigue et al. ................... 709/229 |
| 7,603,718 B2* | 10/2009 | Rounthwaite et al. .......... 726/26 |
| 7,788,713 B2* | 8/2010 | Grobman et al. ............... 726/12 |
| 8,015,211 B2* | 9/2011 | Marceau et al. ............... 707/802 |
| 8,087,068 B1* | 12/2011 | Downey et al. .................... 726/4 |
| 2002/0169539 A1* | 11/2002 | Menard et al. ................ 701/200 |
| 2005/0004873 A1* | 1/2005 | Pou et al. ......................... 705/51 |
| 2005/0289648 A1* | 12/2005 | Grobman et al. ............... 726/12 |
| 2006/0225136 A1* | 10/2006 | Rounthwaite et al. .......... 726/26 |
| 2007/0113096 A1* | 5/2007 | Zhu et al. ....................... 713/180 |
| 2007/0226800 A1* | 9/2007 | Nichols ........................... 726/24 |
| 2008/0098474 A1* | 4/2008 | Nino ............................. 726/17 |
| 2009/0290715 A1* | 11/2009 | Mityagin et al. .............. 380/278 |
| 2010/0138382 A1* | 6/2010 | Nagoya et al. ................ 707/609 |
| 2010/0208590 A1* | 8/2010 | Dolganow et al. ............ 370/235 |
| 2011/0238756 A1* | 9/2011 | Damola et al. ................ 709/204 |

* cited by examiner

Primary Examiner — Teshome Hailu
(74) Attorney, Agent, or Firm — Kramer & Amado, P.C.

(57) ABSTRACT

Various exemplary embodiments relate to a method and related network element including one or more of the following: receiving, in a network element in the telecommunications network, a first plurality of packets transmitted from a P2P client to a P2P central entity, the first plurality of packets relating to a request for peer location information; performing deep packet inspection (DPI) to extract a key from the request for peer location information, the key identifying a P2P content item; querying a key storage module using the key to determine whether the key corresponds to a P2P content item for which transfers are to be prevented; and preventing subsequent transfers of the P2P content item between the P2P client and one or more peers that maintain the P2P content item.

20 Claims, 5 Drawing Sheets

FIG. 1

| Key | Content Description | Request Action | Reply Action |
|---|---|---|---|
| 12a51...51309 | Software w/ Spyware | - | Remove peers from reply |
| a31e3...f728a | Virus-Infected Document | Drop packets & Notify NMS | - |
| fce16...15af8 | Freeware Software | - | - |
| ... | ... | ... | ... |

INLINE KEY-BASED PEER-TO-PEER PROCESSING

TECHNICAL FIELD

Embodiments disclosed herein relate generally to management of traffic in a telecommunications network and, more particularly, to managing transmission of peer-to-peer content over such a network.

BACKGROUND

Modern packet-switched networks accommodate a greater number of users and larger amount of traffic than ever before. Many users have sought to harness the increased bandwidth and connectivity to other users to exchange large files, such as multimedia content and software. To this end, users often engage in so-called Peer-to-Peer (P2P) transfers, in which data is exchanged directly between users, rather than between the user and a central server. Such an approach is advantageous, as it allows sharing of massive amounts of information without the need for a central server with the requisite storage and bandwidth.

Unfortunately, P2P transfers can have a significant impact on the Quality of Experience of other users in the network. As an example, a typical BitTorrent transfer may establish hundreds or even thousands of connections to other peers in the network. Establishing this many connections uses up available bandwidth in transmission lines and burdens the network equipment used to route the packets to the appropriate destination. As the number of users of P2P software has increased, the negative effects on service provider networks have multiplied.

Service providers have been forced to address these problems caused by P2P transfers. Given the significant expenses associated with adding additional equipment, service providers are reluctant to address the P2P problem by simply increasing the capacity of the network. Furthermore, increasing capacity may not be a solution at all, as P2P transfers have the potential to overwhelm any amount of available bandwidth.

As a result, service providers have started to regulate transmission of P2P traffic over their networks. Service providers initially treated all P2P traffic as suspect and gave other transfers preferential treatment over P2P traffic. Such an approach has resulted in significant legal problems for service providers. For example, in the United States, the Federal Communications Commission (FCC) has held that Internet service providers must not discriminate against all P2P traffic, as it violates users' rights to select applications and content of their choice. "Net-neutrality" advocates, those who support fair and equal access to the Internet, have mounted similar legal challenges.

Legal problems aside, treating all P2P traffic as suspect operates on a number of false assumptions. First, such an approach assumes that all P2P transfers are illegitimate, when, in actuality, many content owners use P2P as a cheap, efficient way of allowing users to obtain their content. As an example, many freeware or shareware software developers distribute their software using P2P transfers. Second, the initial approach taken by service providers assumes that P2P transfers have no technical benefits. In fact, P2P transfers allow a massive amount of information to be shared without the need for a large infrastructure of content servers.

Thus, it would be desirable to implement a solution that allows service providers to regulate illegal or otherwise illegitimate P2P transfers, while allowing legitimate P2P transfers to continue as usual. Such a solution would allow service providers to minimize the use of bandwidth for illegal P2P transfers, while preserving net neutrality and harnessing the benefits of P2P for legal transfers.

A solution that distinguishes between P2P transfers based on the underlying content can take a significant amount of time to actually identify the content. As a result, in some instances, a P2P transfer may be completed before the system is able to identify the underlying content. This is particularly problematic for relatively small files, such as documents, images, and some software.

As a result, in systems that attempt to distinguish between content, a user may obtain the content of an illegal or malicious transfer before the network element takes action. For example, if a virus or worm is embedded in a document requested by the user, the system may not identify the document as infected until after the user has downloaded the entire file and the user's system has been infected. Similarly, a user may obtain the entirety of a copyrighted content item before the system detects the transfer.

Thus, it would be further desirable to implement a solution that allows service providers to protect users by preventing illegal or otherwise illegitimate P2P transfers from beginning in the first place. In particular, there is a need for a solution that entirely prevents malicious or illegal P2P transfers by completely blocking the exchange of information between a client and a central entity.

For the foregoing reasons and for further reasons that will be apparent to those of skill in the art upon reading and understanding this specification, there is a need for preventing transmission of identified P2P content over a telecommunications network.

SUMMARY

In light of the present need preventing transmission of identified P2P content over a telecommunications network, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a system and related method for preventing transmission of P2P content over a telecommunications network. In particular, a network element may be configured to receive a first plurality of packets transmitted from a P2P client to a P2P central entity, the first plurality of packets relating to a request for peer location information. The network element may be further configured to receive a second plurality of packets transmitted from the P2P central entity to the P2P client, the second plurality of packets relating to a reply including the peer location information.

Furthermore, the system may include at least one deep packet inspection (DPI) device adapted to perform deep packet inspection (DPI) to extract a key from the request for peer location information, the key identifying a P2P content item, query the key storage module using the key to determine whether the key corresponds to a P2P content item for which transfers are to be prevented, and prevent subsequent transfers of the P2P content item between the P2P client and one or more peers that maintain the P2P content item.

In preventing subsequent transfers, the DPI device or a related network element may drop the request or drop the reply. Alternatively, the DPI device or network element may notify a network management system of the request or reply. As another alternative, the DPI device or network element may modify the contents of the reply, such that the client does not receive the peer location information.

It should be apparent that, in this manner, various exemplary embodiments allow a service provider to protect its users by completely preventing illegal, harmful, or otherwise illegitimate P2P transfers, while allowing other transfers to proceed as normal. In particular, by detecting and performing an action on requests for peer location information sent from a P2P client to a P2P central entity and the corresponding replies, the various exemplary embodiments prevent a client from initiating illegitimate downloads. Such implementations protect a user from damage to his or her computer and from violation of applicable copyright laws.

BRIEF DESCRIPTION OF THE DRAWINGS

In order to better understand various exemplary embodiments, reference is made to the accompanying drawings, wherein.

DETAILED DESCRIPTION

Referring now to the drawings, in which like numerals refer to like components or steps, there are disclosed broad aspects of various exemplary embodiments.

Figure 1:
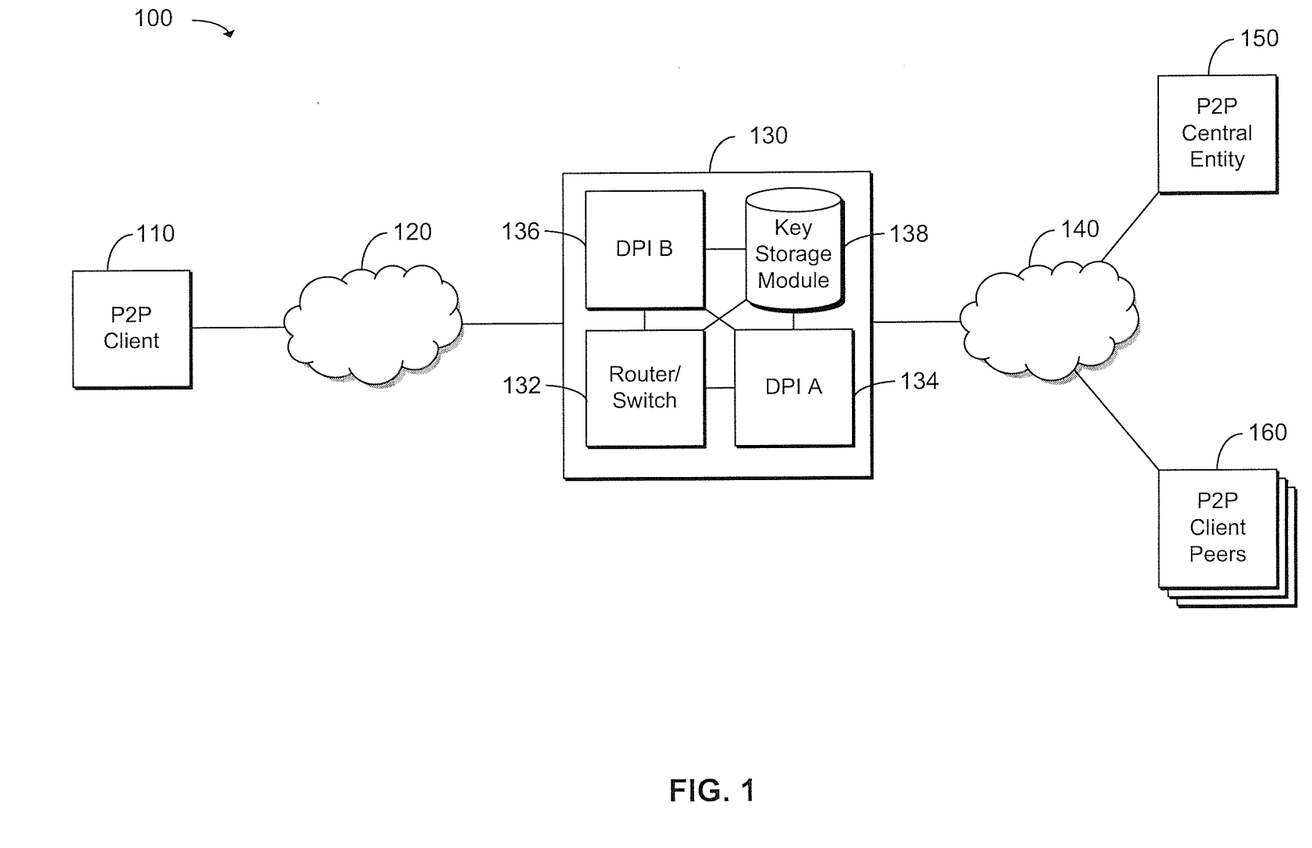
FIG. 1 is a schematic diagram of an exemplary network including a network element configured to prevent transmission of identified peer-to-peer content.

FIG. 1 is a schematic diagram of an exemplary network 100 including a network element 130 configured to prevent transmission of identified peer-to-peer content. Network 100 may include a P2P client 110, a first packet-switched network 120, a network element 130, a second packet-switched network 140, one or more P2P central entities 150, and a plurality of P2P client peers 160. Network element 130 may include a router or switch 132, a first deep packet inspection (DPI) device A 134, a second DPI device B 136, and a key storage module 138.

P2P client 110 may be a device operated by a user that enables access to network 100. More specifically, in various exemplary embodiments, P2P client 110 may be a cell phone, personal or laptop computer, wireless email device, or any other device that supports P2P transfers of data. For example, P2P client 110 may be configured to receive and transmit data according to any P2P protocol known to those of skill in the art, including, but not limited to, BitTorrent, Gnutella, and Fast Track.

Packet-switched network 120 may provide a connection between P2P client 110 and network element 130. Network 120 may be any network capable of sending data and requests between P2P client 110 and network element 130. Accordingly, network 120 may comprise a plurality of routers, switches, bridges, and other components suitable for receiving and forwarding data packets.

Network element 130 may be an entity containing components configured to receive, process, and forward packets belonging to an IP flow received from packet-switched network 120. As an example, network element 130 may be owned and/or operated by an Internet Service Provider (ISP) providing services to P2P client 110. Network element 130 may include a router/switch 132, DPI A 134, DPI B 136, and key storage module 138.

Router/switch 132 of network element 130 may include hardware, instructions encoded on a machine-readable medium, or a combination thereof, such that router/switch 132 may be configured to receive and forward packets. Thus, router/switch 132 may include components to receive a packet from P2P client 110, determine the destination of the packet, and forward the packet toward the appropriate destination. Router/switch 132 may be coupled to at least one of DPI A 134 and DPI B 136, such that the DPI devices 134, 136 may process the packets before they are forwarded toward their destination.

DPI devices 134, 136 may include hardware, instructions encoded on a machine-readable medium, or a combination thereof, such that DPI devices 134, 136 are adapted to examine data packets received by router/switch 132 to identify information associated with the packets. In particular, DPI devices 134, 136 may examine any combination of information in Layers 2 through 7 of the Open Systems Interconnection (OSI) model in order to identify an application protocol and P2P key associated with a data flow.

It should be apparent that a number of arrangements of DPI devices 134, 136 may be used. For example, DPI A 134 and/or DPI B 136 may be standalone devices or may be integrated into router/switch 132. Other suitable arrangements will be apparent to those of skill in the art.

Key storage module 138 may be a machine-readable medium storing a database containing a mapping between P2P keys and a corresponding traffic management action. Key storage module 138 may optionally store a description of the content to indicate, for example, whether the P2P key relates to a video file, audio file, application, or the like. An exemplary data arrangement used for key storage module 138 is described in further detail below with reference to FIG. 2. The information in key storage module 138 may be populated in accordance with Co-Pending application Ser. No. 12/371, 140. "Apparatus and Method for Generating a Database that Maps Metadata to P2P Content" to Dolganow et al., incorporated by reference herein.

Packet-switched network 140 may provide a connection between network element 130, P2P central entity 150, and P2P client peers 160. Network 140 may be any network capable of sending data and requests between network element 130, P2P central entity 150, and P2P client peers 160. Accordingly, as with first network 120, second network 140 may comprise a plurality of routers, switches, bridges, and other components suitable for receiving and forwarding data packets.

P2P central entity 150 may be a system configured to respond to queries from P2P client 110 and P2P client peers 160. In particular, P2P central entity 150 may store a database of information maintained within a particular P2P network, such that a user may search P2P central entity 150 to determine the location of desired content based on the file key. As an example, P2P central entity 150 may be a BitTorrent tracker configured to receive a request including an info_hash from P2P client 110 and respond with a list containing location information of P2P client peers 160 that maintain the requested P2P content. As described in further detail below, the actions performed by network element 130 may be based on the detection and manipulation of a request to and reply from P2P central entity 150.

P2P client peers 160 may be devices operated by users that support P2P transfers of data to P2P client 110. Thus, as with P2P client 110, P2P client peers 160 may be cell phones, personal or laptop computers, wireless email devices, or any other devices that support peer-to-peer transfers of data. For example, P2P client peers 160 may be configured to receive and transmit data according to any P2P protocol known to those of skill in the art, provided that the peers 160 communicate using the same protocol as P2P client 110.

Having described the components of network 100, a brief summary of the operation of network 100 will be provided. It should be apparent that the following description is intended to provide an overview of the operation of network 100 and network element 130 and is therefore a simplification in some respects. The detailed operation of network element 130 will be described in further detail below with reference to FIGS. 3A, 3B, and 3C. Furthermore, although the functionality is described as divided between DPI A 134 and DPI B 136, it should be apparent that all functionality may be performed on a single DPI device or distributed differently between the DPI devices 134, 136.

In operation, according to the various exemplary embodiments, DPI A 134 may be configured to use deep packet inspection to identify an application protocol associated with an IP flow received by router/switch 132, and then determine whether the application protocol is a P2P protocol. DPI A 134 may accomplish this by, for example, performing pattern-based, statistical, or behavioral analysis of the packets being sent and/or received by a given system and thereby classifying an IP flow as "Peer-to-Peer."

An IP flow may be any IP flow between P2P client 110 and P2P central entity 150 or P2P client 110 and a P2P client peer 160, as identifiable by IP 5-tuple information, which includes the source IP address, source port, destination IP address, destination port, and protocol of the IP flow. This IP flow may be further tunneled inside another networking layer, such as IP, Ethernet, ATM, and the like.

When the IP flow uses a P2P protocol, DPI A 134 may transmit the packets belonging to the IP flow to DPI B 136 for further processing. Thus, DPI A 134 may perform initial filtering of traffic that DPI B 136 is to process. Conversely, as described below, DPI B 136 may identify and correlate requests and replies between P2P client 110 and P2P central entity 150, extract key information, and trigger an action to be performed to prevent transfers involving the extracted key.

In particular, upon receipt of the packets from DPI A 134, DPI B 136 may perform deep packet inspection to monitor for a request from P2P client 110 to P2P central entity 150. This request may be, for example, a request for peer location information of peers that maintain the P2P content corresponding to a key included in the request. DPI B 136 may extract the key from the request and access key storage module 138 to determine whether transfers involving the content item corresponding to the key should be prevented. For example, key storage module 138 may indicate P2P content deemed to contain a virus, a worm, spyware, adware, or copyrighted material.

It should be apparent that the monitoring performed by DPI B 136 may involve caching packets until the deep packet inspection can take place. For example, when packets forwarded from DPI A 134 have not yet been positively identified as relating to a P2P protocol, DPI B 136 may temporarily store the packets until the IP flow is properly identified.

As an example, if P2P client 110 operates according to the BitTorrent protocol, client 110 may send a request for peer location information to a tracker, which may correspond to P2P central entity 150. This request may include a field known as the info_hash, which is a 20-byte hash uniquely corresponding to the contents of the torrent. Thus, DPI B 136 may extract the info_hash from the request to the tracker, and then determine whether transfers involving the info_hash should be monitored.

Based upon detection of the request for peer location information by DPI B 136, network element 130 may take an action to prevent subsequent transfers of the corresponding P2P content item between P2P client 110 and one or more of P2P client peers. For example, network element 130 may drop the request, such that P2P client 110 never receives the peer location information from P2P central entity 150. As another example, network element 130 may drop the request and generate a negative acknowledgment back to the P2P client 110, the negative acknowledgement including an empty peer list for the requested P2P file.

Alternatively, DPI B 136 may subsequently perform deep packet inspection to monitor for a reply from P2P central entity 150 to P2P client 110. This reply may identify, for example, the location of a number of P2P client peers 160 that maintain the P2P content corresponding to the key included in the request. Upon recognition of the reply by DPI B 136, network element 130 may take an action to prevent subsequent transfers of the corresponding P2P content item. For example, network element 130 may drop the reply, remove the peer location information from the reply, or take a similar action, provided that P2P client 110 does not receive the peer location information from P2P central entity 150.

It should be apparent from this description of network element 130 that monitoring requests and replies between P2P client 110 and P2P central entity 150 may allow network element 130 to prevent any transfer of illegal or harmful between P2P client 110 and P2P client peers 160. In particular, by preventing P2P client 110 from receiving the peer location information from P2P central entity 150, network element 130 eliminates the possibility of P2P client 110 initiating a download of the illegitimate content.

Figure 2:
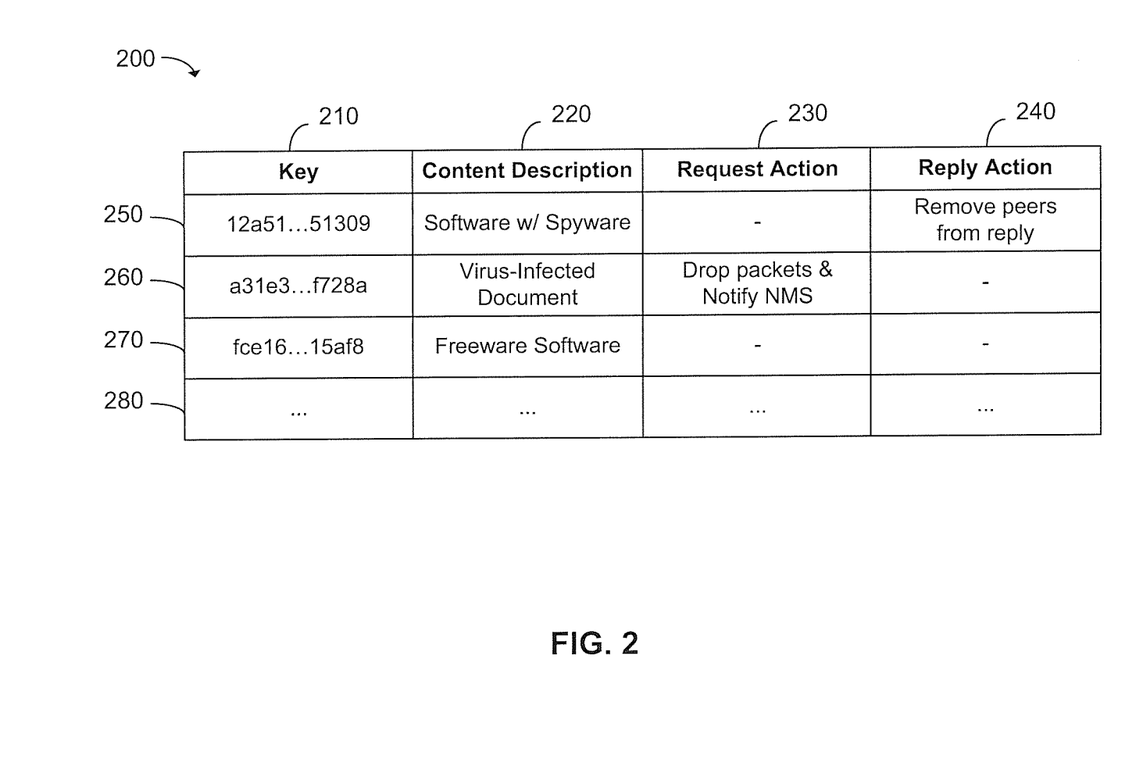
FIG. 2 is a schematic diagram of an exemplary data arrangement used to map a P2P content key to a content description, a request action, and a reply action.

FIG. 2 is a schematic diagram of an exemplary data arrangement 200 used to map a P2P content key 210 to a content description 220, a request action 230, and a reply action 240. Data arrangement 200 may be, for example, a table in a database stored in key storage module 138. Alternatively, data arrangement 200 could be a series of linked lists, an array, or a similar data structure. Thus, it should be apparent that data arrangement 200 is an abstraction of the underlying data; any data structure suitable for storage of this data may be used.

Data arrangement 200 may include four sets of data: a key field 210; a content description field 220; a request action field 230; and a reply action field 240. Key field 210 may indicate the value of a key used to uniquely identify a P2P content item. Optional content description field 220 may indicate a file type, title, or any other information relevant to describing the underlying content item. It should be apparent that content description field 220 is optional, as there is no longer a need for the content description 220 once the key has been identified as matching P2P content and actions have been associated with the key. Request action field 230 may indicate an action to be performed by network element 130 upon detecting a request for peer location information transmitted from a P2P client 110 to a P2P central entity 150. Similarly, reply action field 240 may indicate an action to be performed by network element 130 upon detecting a reply including peer location information transmitted from a P2P central entity 150 to a P2P client 110.

As an example, data entry 250 indicates that the key is "12a51 . . . 51309," that the content corresponding to the key is software detected to include spyware, and that network element 130 should take no action upon detecting a request, but should remove the peer location information from the reply. Data entry 260 indicates that the key is "a31e3 . . . f728a," that the content corresponding to the key is a virus-infected document, and that upon receiving a request, network element 130 should drop the request packets and notify a network management system. Finally, data entry 270 indicates that the key is "fce16 . . . 15af8," that the content corresponding to the key is freeware software, and that network element 130 should allow the transfer to proceed as normal upon detection of the key.

Data arrangement 200 may include numerous other data entries 280. These data entries 280 may be related to any illegal or otherwise illegitimate content. For example, data entries 280 may correspond to content items that have been determined to contain a virus or worm. Similarly, data entries 280 may correspond to content items containing spyware software, which may be software that intercepts or otherwise controls a user's interaction with his or her computer without the user's consent. Alternatively, data entries 280 may correspond to content items containing adware, which may be software that automatically displays, downloads, or otherwise places advertisements on a user's computer. As yet another alternative, data entries 380 may correspond to content items that are protected under the copyright laws of one or more jurisdictions.

Figure 3A:
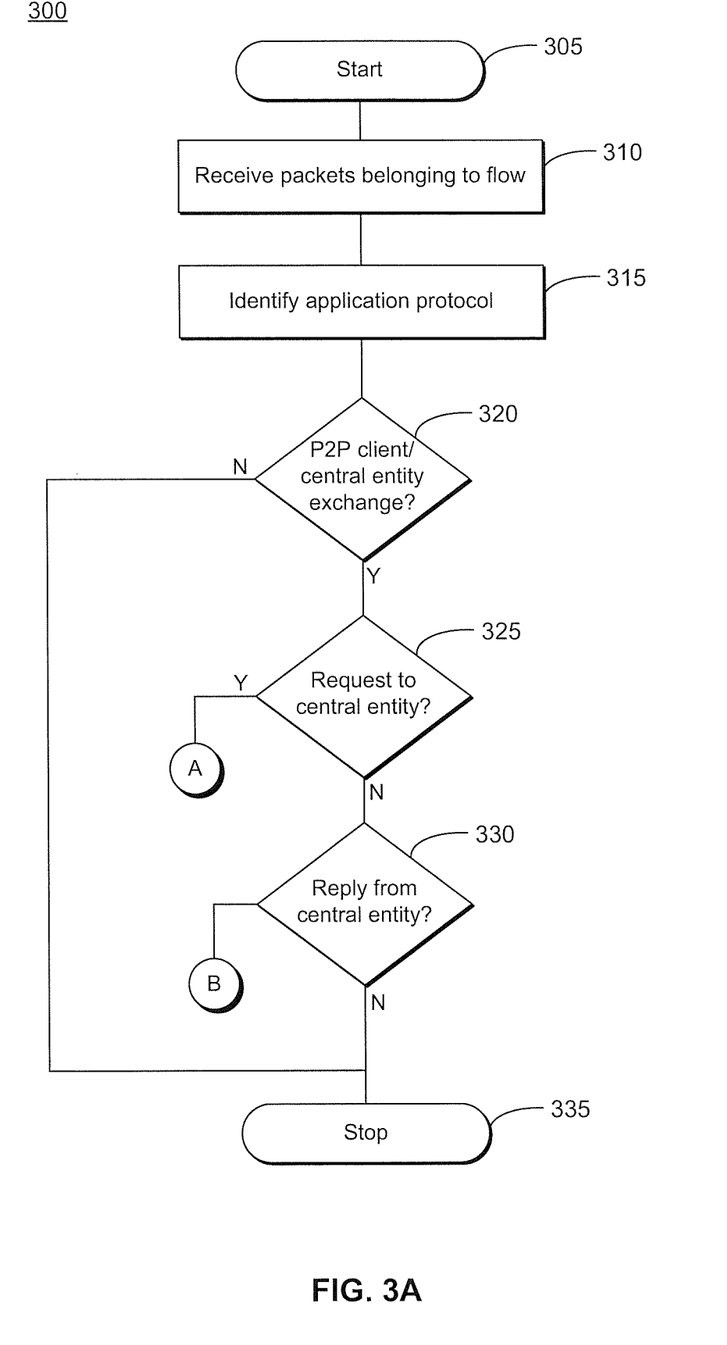
FIG. 3A is a flowchart of an exemplary method of monitoring P2P control exchanges between a P2P client and a P2P central entity.

FIG. 3A is a flowchart of an exemplary method 300 of monitoring P2P control exchanges between a P2P client 110 and a P2P central entity 150. Exemplary method 300 may be performed by the components of network 100 to detect the exchange of control messages between P2P client 110 and P2P central entity 150. In the description that follows, the steps are described as performed by one or more specific components of network 100. As will be apparent to those of skill in the art, the steps may be distributed differently among the components of network 100. As an example, all DPI processing may be performed by a single DPI device.

Exemplary method 300 starts in step 305 and proceeds to step 310, where network element 130 receives a plurality of packets belonging to a flow. As an example, network element 130 may receive a number of packets belonging to an IP flow between a P2P client 110 and a P2P central entity 150. The packets in the IP flow could be related to, for example, a control exchange used to request and return peer location information indicating P2P client peers 160 that store P2P content desired by P2P client 110.

Exemplary method 300 then proceeds to step 315, where DPI A 134 identifies an application protocol associated with the IP flow using one or more packets belonging to the IP flow or any other related information, such as packets belonging to other flows. In particular, as will be apparent to those of skill in the art, DPI A 134 may analyze any combination of information contained in OSI Layers 2 through 7 of the packets to extract an application protocol associated with the IP flow or the P2P client application.

After DPI A 134 performs processing required for identification of a protocol associated with the flow, exemplary method 300 proceeds to decision step 320, where DPI A 134 determines whether the identified application protocol is a P2P protocol. As an example, DPI A 134 may determine whether the identified protocol belongs to a stored list of P2P protocols, including, for example, BitTorrent, FastTrack, and Gnutella.

In decision step 320, DPI A 134 may further determine whether the exchange is between a P2P client 110 and a P2P central entity 150. DPI A 134 may make this determination by, for example, inspecting the format of the transmitted message. Alternatively, DPI A 134 may determine whether the source or destination address of the packets is the address of a system known to operate as a P2P central entity 150, such as a BitTorrent tracker. Suitable alternatives for determining whether the exchange is between a P2P client 110 and a P2P central entity 150 will be apparent to those of skill in the art.

When, in decision step 320, DPI A 134 determines that the application protocol associated with the IP flow is not a P2P protocol or that the exchange is not between a P2P client 110 and a P2P central entity 150, exemplary method 300 proceeds to step 335, where exemplary method 300 stops. Alternatively, when, in decision step 320, DPI A 134 determines that the application protocol associated with the IP flow is a P2P protocol and that the exchange is between a P2P client 110 and a P2P central entity 150, exemplary method proceeds to decision step 325.

In decision step 325, DPI B 136 determines whether the packets relate to a request for peer location information transmitted from a P2P client 110 to a P2P central entity 150. As described above, DPI B 136 may make this determination by, for example, inspecting the format of the transmitted message. Alternatively, DPI B 136 may determine whether the destination of the packets is the address of a system known to operate as a P2P central entity 150. Again, suitable alternatives will be apparent to those of skill in the art.

When, in decision step 325, DPI B 136 determines that the packets relate to a request for peer location information transmitted from a P2P client 110 to a P2P central entity 150, exemplary method 300 proceeds to the processing of FIG. 3B, described in further detail below. Alternatively, when DPI B 136 determines that the packets do not relate to a request for peer location information, exemplary method 300 proceeds to decision step 330.

In decision step 330, DPI B 136 determines whether the packets relate to a reply including peer location information transmitted from a P2P central entity 150 to a P2P client 110. As described above, DPI B 136 may make this determination by, for example, inspecting the format of the transmitted message. Alternatively, DPI B 136 may determine whether the source of the packets is the address of a system known to operate as a P2P central entity 150. Again, suitable alternatives will be apparent to those of skill in the art.

When, in decision step 330, DPI B 136 determines that the packets relate to a reply including peer location information transmitted from a P2P central entity 150 to a P2P client 110, exemplary method 300 proceeds to the processing of FIG. 3C, described in further detail below. Alternatively, when DPI B 136 determines that the packets do not relate to a reply including peer location information, exemplary method 300 proceeds to step 335, where exemplary method 300 stops.

Figure 3B:
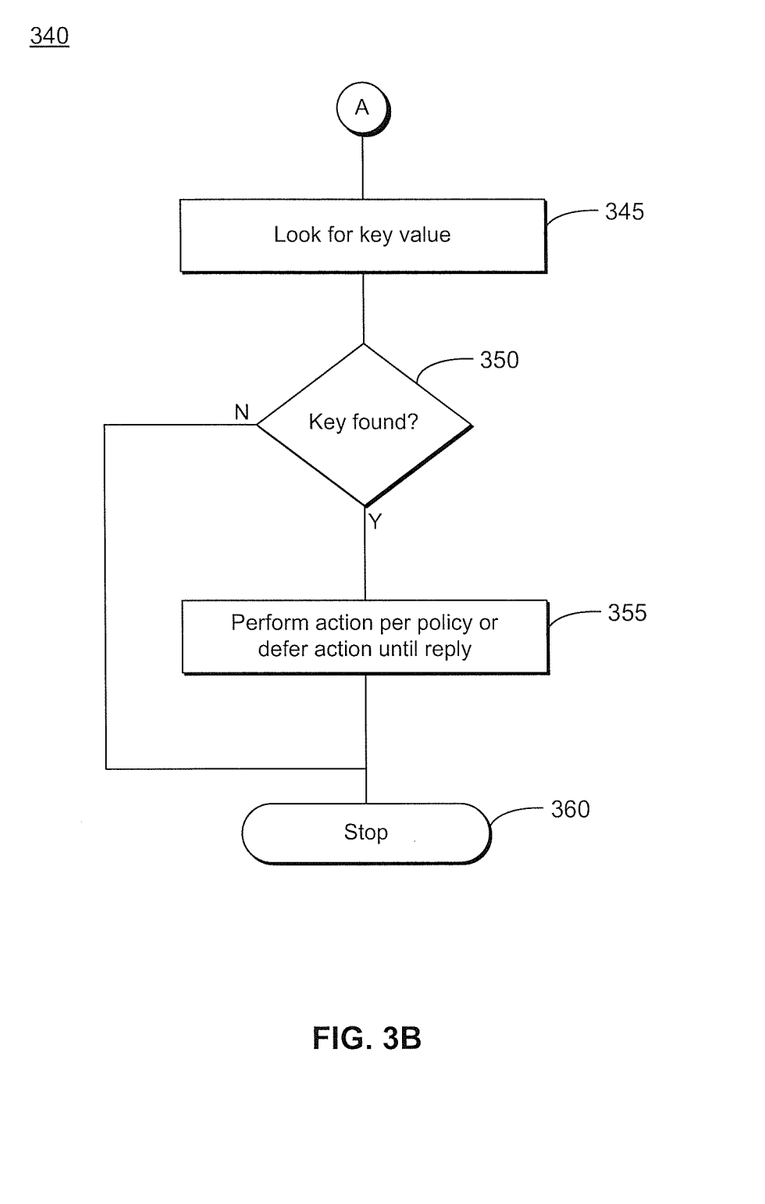
FIG. 3B is a flowchart of an exemplary method of processing a request for peer location information transmitted from a P2P client to a P2P central entity.

FIG. 3B is a flowchart of an exemplary method 340 of processing a request for peer location information transmitted from a P2P client 110 to a P2P central entity 150. As indicated above, the processing of exemplary method 340 may begin upon a determination in decision step 325 of FIG. 3A that the packets relate to a request for peer location information.

In step 345, DPI B 136 performs deep packet inspection on the packets relating to the request to attempt to extract a key identifying the P2P content transmitted in the flow. For example, when the protocol is BitTorrent, DPI B 136 may perform deep packet inspection to determine whether an info_hash field is present in the packets of the flow.

It should be apparent that DPI B 136 may need to inspect multiple packets in order to extract the key from the flow. Thus, DPI B 136 may cache packets, such that multiple packets are used in extracting a key. Furthermore, in some circumstances, DPI B 136 may need to wait until the IP flow is complete before it is able to extract the key. In implementations in which DPI B 136 receives packets from DPI A 134 before the IP flow is positively identified as P2P, DPI B 136 may remove packets from the cache upon identification of the IP flow as non-P2P. As an example, DPI B 136 may trigger removal of these packets from the cache upon receipt of an indication from DPI A 134 that the IP flow is not P2P.

Exemplary method 340 then proceeds to decision step 350, where DPI B 136 determines whether a key identifying the content was located in the packets of the request. In addition to determining whether a key was found in the request itself, DPI B 136 may also query key storage module 138 and, more particularly, data arrangement 300 to determine whether the key relates to a content item for which traffic management is desired. When, in decision step 350, DPI B 136 determines that a key was not found, exemplary method 340 proceeds to step 360, where exemplary method 340 stops. Alternatively, when, in decision step 350, DPI B 136 determines that a key was found, exemplary method 340 proceeds to step 355.

In step 355, DPI B 136 triggers an action to prevent subsequent transfers of the content item corresponding to the identified key. Such triggering may result in DPI B 136, network element 130, or some other component of network 100 performing the action. In particular, DPI B 136 may trigger an action corresponding to the identified key in request action field 230 of key storage module 138.

Such an action may be designed, for example, to ensure that P2P client 110 does not receive location information regarding peers that store the content item. As an example, the action may entail dropping of all packets related to the request for peer information, such that P2P central entity 150 does not receive the request. As an alternative, the action may entail notifying a network management system that the P2P client 110 has transmitted a request for peer location information of a P2P content item of interest. Other suitable actions will be apparent to those of skill in the art.

Alternatively, the action to be performed may be deferred until detection of the subsequent reply transmitted from P2P central entity 150 to P2P client 110. In such implementations, to facilitate subsequent identification of the reply, DPI B 136 may, for example, store the extracted key and any information necessary to identify the subsequent reply in key storage module 138. Such information may include, for example, any information necessary to uniquely identify the IP flow between P2P central entity 150 and P2P client 110 that is part of the same application session and any information required to correlate a reply to the request.

After network element 130 takes an action or defers such action until the reply is received, exemplary method 340 proceeds to step 360, where exemplary method 340 stops.

Figure 3C:
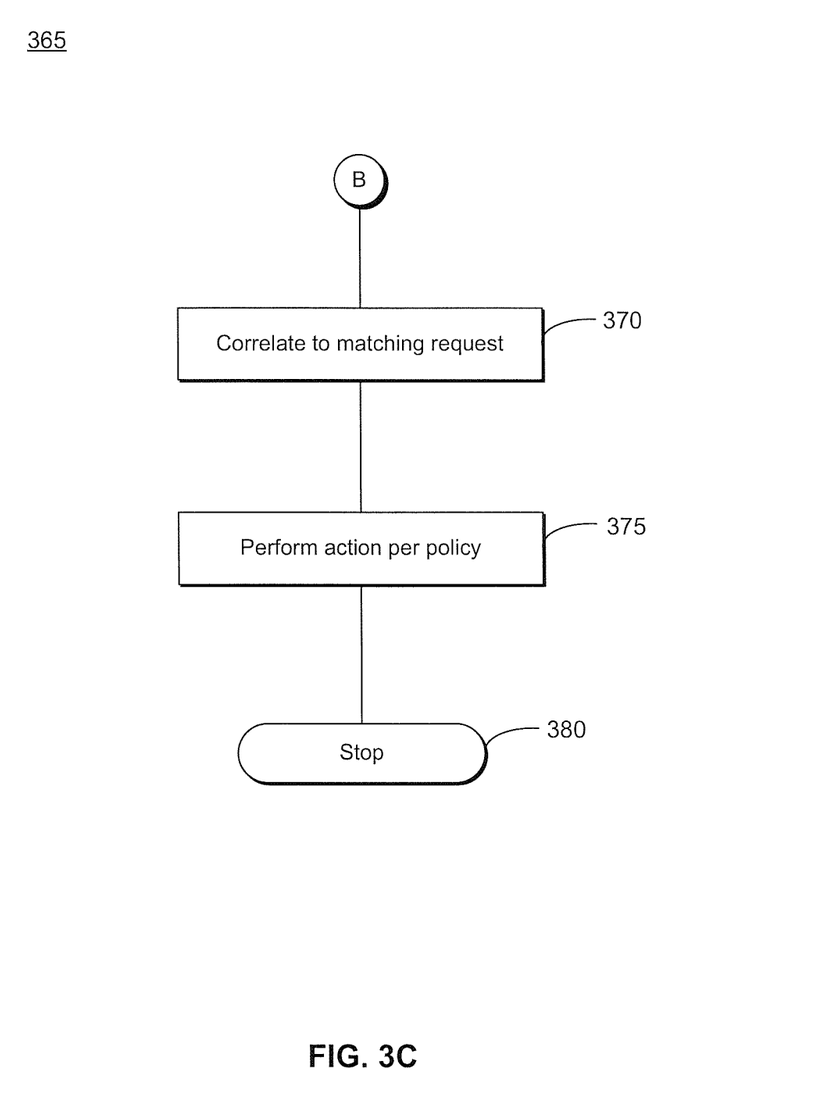
FIG. 3C is a flowchart of an exemplary method of processing a reply including peer location information transmitted from a P2P central entity to a P2P client.

FIG. 3C is a flowchart of an exemplary method 365 of processing a reply including peer location information transmitted from a P2P central entity 150 to a P2P client 110. As indicated above, the processing of exemplary method 365 may begin upon a determination in decision step 330 of FIG. 3A that the packets relate to a reply including peer location information.

In step 370, DPI B 136 compares the reply to the database of looked-for responses. In particular, DPI B 136 may attempt to correlate the reply transmitted by a P2P central entity 150 to a request previously transmitted by a P2P client 110. In making this determination, DPI B 136 may consider, for example, the fields, source, and destination of the detected reply, and the fields, source, and destination of any requests stored in key storage module 138. Other factors used in correlating a request to a reply will be apparent to those of skill in the art based on knowledge of the underlying protocol.

Exemplary method 365 then proceeds to step 375, where DPI B 136 may trigger an action to prevent subsequent transfers of the content item corresponding to the identified key. Such triggering may result in DPI B 136, network element 130, or some other component of network 100 performing the action. In particular, DPI B may trigger an action corresponding to the identified key in reply action field 240 of key storage module 138. Such an action may be designed, for example, to ensure that P2P client 110 does not receive the peer location information included in the reply.

As an example, the action may entail dropping all packets related to the reply including peer information, such that P2P client 110 does not receive the reply. As an alternative, the action may entail removing all peer location information from the reply to generate a modified reply, then sending the modified reply from network element 130 to P2P client 110. Similarly, the action may entail generating a modified reply indicating that the request for peer information failed at P2P central entity 150, then sending the reply from network element 130 to P2P client 110. For example, when the P2P protocol is BitTorrent, network element 130 may send a message with the failure reason field set to, "Unable to locate any peers."

In each of these implementations, the reply to P2P client 110 will not include any peer location information, such that P2P client 110 will be unable to download the content item. Other suitable actions will be apparent to those of skill in the art. After performing the action specified by the policy maintained in key storage module 138, exemplary method 365 proceeds to step 380, where method 365 stops.

According to the foregoing, various exemplary embodiments enable a service provider to protect its users by completely preventing illegal, harmful, or otherwise illegitimate P2P transfers, while allowing other transfers to proceed as normal. In particular, by detecting and performing an action on requests for peer location information sent from a P2P client to a P2P central entity and the corresponding replies, the various exemplary embodiments prevent a client from initiating illegitimate downloads.

Related techniques for monitoring and managing P2P transfers are detailed in the following co-pending applications, each of which is incorporated by reference herein: application Ser. No. 12/371,079. "Optimized Mirror for P2P Identification" to Dolganow et al.; application Ser. No. 12/371,197. "Peer-to-Peer Traffic Management Based on Key Presence in Peer-to-Peer Data Transfers" to Dolganow et al.; and application Ser. No. 12/371,234, "Peer-to-Peer Traffic Management Based on Key Presence in Peer-to-Peer Control Transfers" to Dolganow et al.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a network node (e.g. router or switch). Thus, a machine-readable storage medium may include read-only memory (ROM), random-access memory (RAM), magnetic disk storage media, optical storage media, flash-memory devices, and similar storage media.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications may be implemented while remaining within the spirit and scope of the invention. Accordingly, the foregoing disclosure, description, and figures are for illustrative purposes only and do not in any way limit the invention, which is defined only by the claims.

What is claimed is:

1. A method for preventing transmission of peer-to-peer (P2P) content over a telecommunications network, the method comprising:
receiving, in a network element in the telecommunications network, a first plurality of packets transmitted from a P2P client to a P2P central entity, the first plurality of packets relating to a request for peer location information of one or more peers that maintain a P2P content item corresponding to a key included in the request;
performing deep packet inspection (DPI) to extract the key from the request for peer location information, the key identifying the P2P content item;
querying a key storage module using the key to determine whether the key corresponds to a P2P content item for which transfers are to be prevented; and
preventing subsequent transfers of the P2P content item between the P2P client and the one or more peers that maintain the P2P content item.

2. The method for preventing transmission of P2P content according to claim 1, wherein the step of preventing subsequent transfers of the P2P content item comprises:
dropping the first plurality of packets, such that the P2P central entity does not receive the request for peer location information from the P2P client.

3. The method for preventing transmission of P2P content according to claim 1, wherein the step of preventing subsequent transfers of the P2P content item comprises:
notifying a network management system (NMS) that the P2P client has transmitted a request for peer location information regarding the P2P content item.

4. The method for preventing transmission of P2P content according to claim 1, further comprising:
detecting, in the network element, a second plurality of packets transmitted from the P2P central entity to the P2P client, the second plurality of packets relating to a reply including the peer location information.

5. The method for preventing transmission of P2P content according to claim 4, wherein the step of preventing subsequent transfers of the P2P content item comprises:
dropping the second plurality of packets, such that the P2P client does not receive the reply including the peer location information.

6. The method for preventing transmission of P2P content according to claim 4, wherein the step of preventing subsequent transfers of the P2P content item comprises:
removing all peer location information from the reply to generate a modified reply; and
sending the modified reply from the network element to the P2P client.

7. The method for preventing transmission of P2P content according to claim 4, wherein the step of preventing subsequent transfers of the P2P content item comprises:
generating a modified reply, the modified reply indicating that the request for peer location information failed at the P2P central entity; and
sending the modified reply from the network element to the P2P client.

8. The method for preventing transmission of P2P content according to claim 1, wherein the key storage module maintains a database comprising a plurality of keys, each key corresponding to a P2P content item containing at least one of a virus and a worm.

9. The method for preventing transmission of P2P content according to claim 1, wherein the key storage module maintains a database comprising a plurality of keys, each key corresponding to a P2P content item containing at least one of spyware software and adware software.

10. The method for preventing transmission of P2P content according to claim 1, wherein the key storage module maintains a database comprising a plurality of keys, each key corresponding to a copyrighted P2P content item.

11. A system for preventing transmission of peer-to-peer (P2P) content over a telecommunications network, the system comprising:
a network element configured to receive a first plurality of packets transmitted from a P2P client to a P2P central entity, the first plurality of packets relating to a request for peer location information of one or more peers that maintain a P2P content item corresponding to a key included in the request;
a key storage module maintaining a plurality of keys corresponding to P2P content items for which transfers are to be prevented; and
at least one deep packet inspection (DPI) device adapted to:
perform deep packet inspection (DPI) to extract the key from the request for peer location information, the key identifying the P2P content item,
query the key storage module using the key to determine whether the key corresponds to a P2P content item for which transfers are to be prevented, and
prevent subsequent transfers of the P2P content item between the P2P client and the one or more peers that maintain the P2P content item.

12. The system for preventing transmission of P2P content according to claim 11, wherein the at least one DPI device is further adapted to:
trigger dropping of the first plurality of packets, such that the P2P central entity does not receive the request for peer location information from the P2P client.

13. The system for preventing transmission of P2P content according to claim 11, wherein the at least one DPI device is further adapted to:
trigger notification of a network management system (NMS) that the P2P client has transmitted a request for peer location information regarding the P2P content item.

14. The system for preventing transmission of P2P content according to claim 11, wherein the at least one DPI device is further adapted to:
detect a second plurality of packets transmitted from the P2P central entity to the P2P client, the second plurality of packets relating to a reply including the peer location information.

15. The system for preventing transmission of P2P content according to claim 14, wherein the at least one DPI device is further adapted to;
trigger dropping of the second plurality of packets, such that the P2P client does not receive the reply including the peer location information.

16. The system for preventing transmission of P2P content according to claim 14, wherein the at least one DPI device is further adapted to:
- remove all peer location information from the reply to generate a modified reply; and
- trigger sending of the modified reply from the network element to the P2P client.

17. The system for preventing transmission of P2P content according to claim 14, wherein the at least one DPI device is further adapted to:
- generate a modified reply, the modified reply indicating that the request for peer location information failed at the P2P central entity; and
- trigger sending of the modified reply from the network element to the P2P client.

18. The system for preventing transmission of P2P content according to claim 11, wherein each key in the key storage module corresponds to a P2P content item containing at least one of a virus and a worm.

19. The system for preventing transmission of P2P content according to claim 11, wherein each key in the key storage module corresponds to a P2P content item containing at least one of spyware software and adware software.

20. The system for preventing transmission of P2P content according to claim 11, wherein each key in the key storage module corresponds to a copyrighted P2P content item.

* * * * *